(12) United States Patent
Tune et al.

(10) Patent No.: US 7,945,806 B2
(45) Date of Patent: May 17, 2011

(54) DATA PROCESSING APPARATUS AND METHOD FOR CONTROLLING A TRANSFER OF PAYLOAD DATA OVER A COMMUNICATION CHANNEL

(75) Inventors: Andrew David Tune, Dronfield (GB); Robin Hotchkiss, Barnacre (GB)

(73) Assignee: ARM Limited, Cambridge (GB)

( * ) Notice: Subject to any disclaimer, the term of this patent is extended or adjusted under 35 U.S.C. 154(b) by 773 days.

(21) Appl. No.: 11/976,606

(22) Filed: Oct. 25, 2007

(65) Prior Publication Data

US 2008/0294929 A1   Nov. 27, 2008

(30) Foreign Application Priority Data

May 23, 2007   (GB) .................................. 0709911.2

(51) Int. Cl.
*G06F 5/06* (2006.01)
*G06F 13/00* (2006.01)
*G06F 13/14* (2006.01)
(52) U.S. Cl. .................. 713/600; 710/110; 710/305
(58) Field of Classification Search .................. 713/600
See application file for complete search history.

(56) References Cited

U.S. PATENT DOCUMENTS

| 6,128,749 | A  | * | 10/2000 | McDonnell et al. | .......... 713/600 |
|-----------|----|---|---------|------------------|-------|
| 7,069,376 | B2 |   | 6/2006  | Mathewson et al. |       |
| 7,426,600 | B2 | * | 9/2008  | Takaba           | .......... 710/316 |
| 7,461,187 | B2 | * | 12/2008 | Morishita et al. | ............... 710/60 |
| 7,590,921 | B1 | * | 9/2009  | Goodson          | ....................... 714/774 |
| 2004/0199821 | A1 |   | 10/2004 | Flautner et al.  |       |
| 2004/0251954 | A1 | * | 12/2004 | Mathewson et al. | .......... 327/520 |
| 2004/0267994 | A1 | * | 12/2004 | Mathewson et al. | .......... 710/110 |
| 2009/0300382 | A1 | * | 12/2009 | Bruce et al.     | ................... 713/310 |

* cited by examiner

*Primary Examiner* — Suresh K Suryawanshi
(74) *Attorney, Agent, or Firm* — Nixon & Vanderhye P.C.

(57) ABSTRACT

A data processing apparatus has initiator circuitry for initiating a transfer of payload data in a first clock cycle, and recipient circuitry for receiving the payload data in a later clock cycle. A communication channel carries the payload data along with associated transfer control information. Timing of receipt of the payload data by the recipient circuitry is controlled by the transfer control information. Timing easing circuitry located within the communication channel temporarily buffers the transfer control information before outputting it to the recipient circuitry. The timing easing circuitry is responsive to a specified timing easing value to determine a time for which the transfer control information is temporarily buffered. The number of clock cycles that elapses between the first clock cycle and the later clock cycle depends on the specified timing easing value. This enables a multi-cycle path to be provided to transfer the payload data.

16 Claims, 13 Drawing Sheets

DATA PROCESSING APPARATUS AND METHOD FOR CONTROLLING A TRANSFER OF PAYLOAD DATA OVER A COMMUNICATION CHANNEL

TECHNICAL FIELD

The technical field relates to a data processing apparatus and method for controlling a transfer of payload data over a communication channel.

BACKGROUND

It is known to provide a data processing apparatus having logic elements which can communicate with each other over a communication channel. Communication between the logic elements occurs via transfers which may be issued from one logic element (referred to herein as the initiator logic element or initiator circuitry) to another logic element (referred to herein as the recipient logic element or recipient circuitry) via the communication channel. Often, the data processing apparatus will include multiple logic elements, and individual logic elements may be able to act as initiator logic elements for certain transfers and recipient logic elements for other transfers. Each transfer will typically consist of some payload data and associated control data and the communication channel over which the transfer takes place will typically consist of one or more communication paths between the initiator circuitry and the recipient circuitry. Whilst it is often the case that the payload data and the associated control data follow the same path between the initiator circuitry and the recipient circuitry, it is possible that quite distinct paths may be provided for the payload data and the associated control data, with those distinct paths forming the communication channel.

In a data processing apparatus having multiple logic elements, it is known to provide bus logic for providing the required communication paths used to form the communication channels between the various logic elements. One example of such bus logic is an interconnect circuit which provides multiple connections over which communication paths can be established between initiator logic elements and recipient logic elements.

Typically a clock signal is used to control the operation of various logic elements within the data processing apparatus, and to control the transfer of signals between those logic elements. When designing such an apparatus, regard will usually be taken of the target clock speed, i.e. operating frequency, that the apparatus will need to run at, since this will ultimately limit how much processing a particular logic element can perform in a single clock cycle, and how far a signal may pass along a communication path in each clock cycle.

As data processing apparatus increase in complexity, so the interconnect circuitry or the like used to provide the various communication paths between the logic elements of the data processing apparatus also increases in complexity, and such interconnect circuitry may provide paths therein that could fail to meet the timing requirements set by the target clock speed for the system. One known technique to seek to reduce the likelihood of certain paths failing timing requirements involves the use of a register slice component added into a particular communication path in order to separate that path into distinct path portions, with the payload data and associated control data being temporarily stored in the register slice prior to being propagated along the next path portion. Hence, the register slice component alleviates the timing problem by dividing a particular path into two parts, at the cost of adding a clock cycle of latency and a large number of flops. More details of such register slice components are described for example in commonly assigned U.S. Pat. No. 7,069,376, the entire contents of which are hereby incorporated by reference.

As discussed earlier, interconnect circuitry will typically provide a plurality of connections over which communication paths can be established coupling multiple logic elements, and the way in which the various transfers are routed via those communication paths will be dependent on the bus protocol employed within the interconnect circuitry. One known type of bus protocol that has been developed is known as the split transaction protocol. In accordance with such a split transaction protocol, the plurality of communication paths within the interconnect circuitry provide at least one address channel for carrying address transfers and at least one data channel for carrying data transfers. An example of such a split transaction protocol is the AXI (Advanced eXtensible Interface) protocol developed by ARM Limited, Cambridge, United Kingdom. The AXI protocol provides a number of channels over which payload data and associated control data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to a master logic element at the end of a write transaction, such transaction status information indicating for example whether the transaction completed successfully, or whether an error occurred, etc.

Whilst the above-mentioned register slice components can be used in a variety of different embodiments in order to alleviate timing constraints in communication paths, one particular embodiment where they are used is in interconnect circuits conforming to the AXI protocol. Currently there are three different variants of register slice component which can be used in such interconnect circuits, all of which require one or more arrays of flops to satisfy their functional and behavioural requirements.

Table 1 below shows the number of flops required for each register slice type and data width in association with the data path, i.e. to register the payload data, and does not include any additional flops used as part of the control mechanism:

TABLE 1

| Type | 32-bit | 64-bit | 128-bit |
|---|---|---|---|
| Fully registered | 388 | 524 | 796 |
| Forward path | 194 | 262 | 398 |
| Reverse path | 194 | 262 | 398 |

It should be noted that the figures in Table 1 above are based on the signal set provided in the AMBA AXI protocol specification, and do not include any additional signals that may have been added or extended since that release. However, it is clear from the above figures that a large number of flops are required for each register slice component inserted within a communication path of the interconnect circuitry. Although silicon real estate is reasonably cheap in modern technologies, there are cases where the current register slice components may be considered too large, for example in FPGA or tightly constrained modular designs.

Accordingly, it would be desirable to provide a simpler mechanism for alleviating timing constraints for payload data passing over a communication channel within a data processing apparatus.

SUMMARY

Viewed from a first aspect, the technology described in this application provides a data processing apparatus comprising: initiator circuitry for initiating a transfer of payload data in a first clock cycle; recipient circuitry for receiving the payload data the subject of the transfer in a later clock cycle; a communication channel over which the payload data is passed from the initiator circuitry to the recipient circuitry, the communication channel further passing transfer control information associated with the transfer between the initiator circuitry and the recipient circuitry, timing of receipt of the payload data by the recipient circuitry being controlled by the transfer control information; and timing easing circuitry located within the communication channel for temporarily buffering at least the transfer control information generated by the initiator circuitry before outputting that transfer control information to the recipient circuitry, the timing easing circuitry being responsive to a specified timing easing value to determine a time for which that transfer control information is temporarily buffered before being output to the recipient circuitry; whereby the number of clock cycles that elapse between the first clock cycle and the later clock cycle is dependent on the specified timing easing value.

Timing easing circuitry is provided within the communication channel for temporarily buffering at least the transfer control information generated by the initiator circuitry before outputting that transfer control information to the recipient circuitry. Timing of receipt of the payload data by the recipient circuitry is controlled by the transfer control information, and accordingly by temporarily buffering at least the transfer control information generated by the initiator circuitry, this can increase the number of clock cycles allowed for the payload data to be passed over the communication channel from the initiator circuitry to the recipient circuitry. In particular, the timing easing circuitry is responsive to a specified timing easing value to determine a time for which the transfer control information is temporarily buffered, and the number of clock cycles that elapses between the initiator circuitry initiating the transfer of payload data and the recipient circuitry receiving the payload data is dependent on the specified timing easing value.

The temporary buffering of transfer control information allows a multiple-cycle path to be used for the transfer of the payload data, thereby avoiding the need to insert register slice components. The timing easing circuitry is significantly smaller and less complex than such register slice components, and accordingly, saves a significant amount of area when compared with the addition of a register slice. This area saving additionally gives rise to power saving benefits.

The transfer control information can take a variety of forms. In one embodiment, it may merely comprise a strobe-type signal sent from the initiator circuitry to the recipient circuitry in association with the payload data to identify the validity of the payload data. However, in an alternative embodiment, the transfer control information comprises a first signal issued by the initiator circuitry and a second signal issued by the recipient circuitry, the first and second signals being employed to implement a handshake protocol controlling timing of receipt of the payload data by the recipient circuitry, and at least the first signal being temporarily buffered by the timing easing circuitry. In some embodiments, only the first signal is temporarily buffered, whilst in other embodiments both the first signal and the second signal may be temporarily buffered.

There are a number of different handshake protocols that could be used. For example, in one embodiment, a request-acknowledge form of handshake protocol could be used with the first signal then taking the form of a request signal, and the second signal taking the form of an acknowledge signal. However, in an alternative embodiment, the first signal is a valid signal which when asserted identifies that the payload data is valid, and the second signal is a ready signal which when asserted identifies that the recipient circuitry is available to receive the payload data, the timing easing circuitry being responsive to the valid signal being asserted to temporarily buffer the valid signal. Such a valid-ready protocol is used in the earlier-mentioned AXI protocol developed by ARM Limited, Cambridge, United Kingdom.

In one embodiment, if on assertion of the valid signal by the initiator circuitry, the initiator circuitry observes an asserted ready signal from the recipient circuitry, it will then assume that the payload data will be received by the recipient circuitry, and will accordingly in a following clock cycle de-assert the valid signal and de-assert the payload data. However, because the timing easing circuitry temporarily buffers the valid signal, the asserted valid signal may not by that time have been received by the recipient circuitry, and accordingly the recipient circuitry may not yet have sampled the payload data. Accordingly, in one embodiment, the timing easing circuitry is operable whilst the valid signal is being temporarily buffered to selectively modify the ready signal to prevent the ready signal if asserted from being forwarded to the initiator circuitry. Accordingly, this prevents the initiator circuitry from seeing an asserted ready signal whilst its valid signal is still being temporarily buffered by the timing easing circuitry.

In one embodiment, only the valid signal is temporarily buffered by the timing easing circuitry. However, in an alternative embodiment, the timing easing circuitry is further operable to temporarily buffer the ready signal. By temporarily buffering the ready signal, the timing easing circuitry of such embodiments can be used as a simple, low gate count, alternative to the earlier-mentioned fully registered register slice component.

In many embodiments, the ready signal is not arranged to be a "sticky" signal, in that the recipient circuitry can assert and de-assert the ready signal at will irrespective of whether an asserted valid signal has been observed since the ready signal was asserted. However, in some embodiments, the ready signal can be arranged to be a sticky ready signal such that once the ready signal has been asserted, the ready signal cannot be de-asserted by the recipient circuitry until an asserted valid signal is received by the recipient circuitry. If such a sticky ready signal is used in embodiments where the timing easing circuitry also temporarily buffers the ready signal, then the timing easing circuitry is able to temporarily buffer the ready signal without increasing latency added to the transfer by the timing easing circuitry. Hence, in this particular embodiment, the ready signal can be temporarily buffered without increasing latency when compared with timing easing circuitry that does not buffer the ready signal.

In one embodiment, the valid signal is a sticky valid signal such that once the valid signal has been asserted, the valid signal cannot be de-asserted by the initiator circuitry until the asserted ready signal is received by the initiator circuitry. Whilst the valid signal is asserted the payload data will continue to be asserted, and hence the payload data will continue to be asserted until an asserted ready signal is received by the initiator circuitry.

The timing easing circuitry can take a variety of forms. However, in one embodiment, the timing easing circuitry comprises: counter circuitry which is responsive to each iteration of the clock cycle following receipt by the timing easing circuitry of the transfer control information to modify a count value, the count value being initialized to an initial value, and the transfer control information being output when the count value reaches a predetermined value which is dependent on said specified timing easing value.

Hence, in such embodiments the specified timing easing value determines how many clock cycles the counter circuitry counts for before the transfer control information is output, and hence the specified timing easing value determines the number of clock cycles that elapse between the time that the transfer of payload data is initiated by the initiator circuitry and the time that payload data is later received by the recipient circuitry.

In one embodiment, the initial value of the count value is zero, and the count value is incremented on each iteration of the clock cycle, the timing easing circuitry further comprising: comparator circuitry for comparing the count value with the specified timing easing value and for outputting the transfer control information that has been temporarily buffered once the count value reaches said predetermined value, said predetermined value being derived from the specified timing easing value. In one particular embodiment, the predetermined value is set equal to the specified timing easing value.

In one embodiment, the counter circuitry is re-initialized when the transfer is received by the recipient circuitry. In one particular embodiment, this is achieved by assessing the value of the valid signal as received by the recipient circuitry and the value of the ready signal issued by the recipient circuitry in any particular clock cycle, and if in a particular clock cycle the valid signal as received by the recipient circuitry and the ready signal as issued by the recipient circuitry are both asserted, then this is used to reset the counter circuitry.

In one embodiment, the transfer control information that is temporarily buffered is a single bit value, the counter circuitry is responsive to the transfer control information being set to a first value to begin modifying the count value, and the counter circuitry is responsive to the count value reaching the predetermined value to output the transfer control information set to said first value, thereby causing the transfer control information to be temporarily buffered. Hence, in such embodiments, the assertion of the transfer control information itself (set to a first value) is used to trigger the counter mechanism, and the counter circuitry directly outputs the asserted transfer control information once the count value has reached the predetermined value, thereby causing the transfer control information to be temporarily buffered. This hence avoids the need for any separate latching of the transfer control information whilst the counter circuitry is operating to introduce the delay required by the specified timing easing value.

In one embodiment, the specified timing easing value is fixed, and accordingly may be hard-wired as an input to the timing easing circuitry. However, in an alternative embodiment, the specified timing easing value may be programmable. This would enable some tuning of the specified timing easing value having regard to the setup requirements of the recipient circuitry so as to trade off that setup requirement against the latency introduced by use of the timing easing circuitry.

The counter circuitry can take a variety of forms. However, in one embodiment, the specified timing easing value is fixed to specify one clock cycle and the counter circuitry comprises a register for storing the count value, the count value being initialized to zero, and being changed to a logic 1 value following the elapse of one clock cycle to thereby cause the transfer control information to be output, whereby two clock cycles are provided for the payload data to be passed over the communication channel from the initiator circuitry to the recipient circuitry. Accordingly, in this particular embodiment, the counter circuitry can be provided using a simple register with a feedback mechanism from its output to its input to cause the output value to be toggled between a logic zero value and a logic one value so as to introduce one extra cycle of delay with regard to the transfer of the transfer control information, which thereby allows the payload data to take two clock cycles to be transferred from the initiator circuitry to the recipient circuitry whilst avoiding the need for any register slice component to be introduced into the payload path.

In one embodiment, the data processing apparatus further comprises error determination circuitry for detecting a mis-sampling of the signal by the recipient circuitry and generating an error signal upon such detection, the specified timing easing value being chosen in dependence on said error signal. If it is possible to detect when a signal has been mis-sampled by the recipient circuitry, then this information can be used to vary the specified timing easing value, in particular to increase that specified timing easing value in order to increase the number of clock cycles allowed for the payload data to be passed from the initiator circuitry to the recipient circuitry, thereby providing more setup time for the recipient circuitry.

The error determination circuitry can be formed in a variety of ways. For example, commonly assigned US Patent Publication No. US 2004-0199821, the entire contents of which are hereby incorporated by reference, describes an integrated circuit in which a sampling circuit is arranged to sample a digital signal value at a first time and at a second later time, with any difference in the digital signal value samples being indicative of an error in operation of the integrated circuit. Error repair logic is then used to repair the error in operation. This technique recognises that the operation of the processing stages themselves can be directly monitored to find the limiting conditions in which they fail. When actual failures occur, then these errors can be corrected such that incorrect operation overall is not produced. It has been found that the performance advantages achieved by the avoidance of excessively cautious performance margins that may be used in more conventional approaches compared with the direct observation of the failure point when using the technique of the above US patent application more than compensates for the additional time and power consumed in recovering the system when a failure does occur. Assuming the recipient circuitry was constructed in a similar manner to the above-mentioned sampling circuit then a mis-sampling of the signal by the recipient circuitry could be detected and an error signal generated which could then be used to vary the specified timing easing value.

Viewed from a second aspect, the technology described in this application provides a method of controlling a transfer of payload data over a communication channel between initiator circuitry and recipient circuitry, the communication channel further passing transfer control information associated with the transfer between the initiator circuitry and the recipient circuitry, timing of receipt of the payload data by the recipient circuitry being controlled by the transfer control information, the method comprising the steps of: at the initiator circuitry, initiating the transfer of payload data in a first clock cycle; at the recipient circuitry, receiving the payload data the subject of the transfer in a later clock cycle; temporarily buffering within timing easing circuitry within the communication channel at least the transfer control information generated by the initiator circuitry before outputting that transfer control information to the recipient circuitry; and controlling output of the transfer control information from the timing easing circuitry having regard to a specified timing easing value identifying a time for which that transfer control information is temporarily buffered; whereby the number of clock cycles that elapse between the first clock cycle and the later clock cycle is dependent on the specified timing easing value.

DESCRIPTION OF NON-LIMITING, EXAMPLE EMBODIMENTS

Figure 1A:
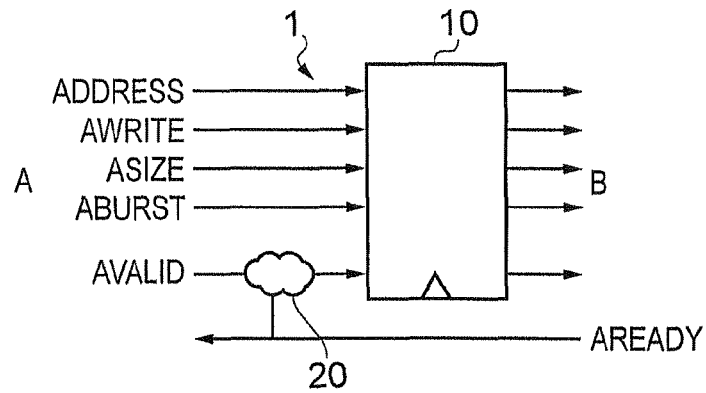
FIGS. 1A and 1B are diagrams schematically illustrating example implementations of register slices.
Figure 1B:
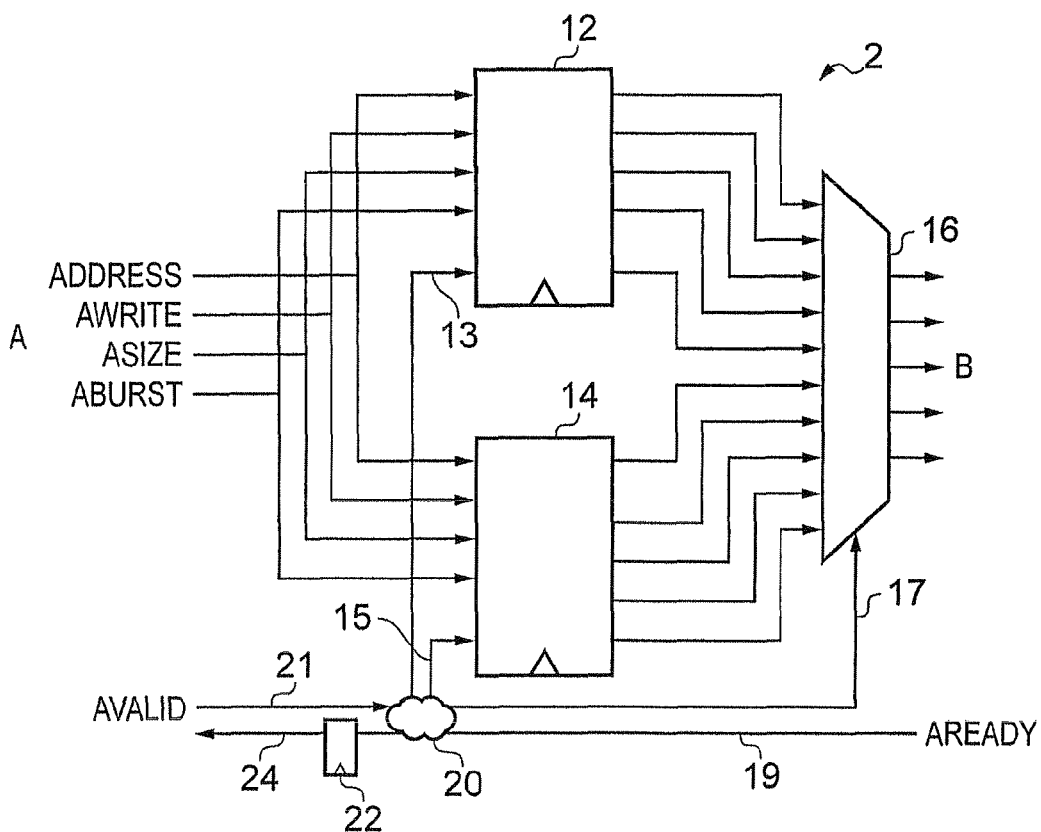

Before discussing in detail various non-limiting, example embodiments that may be used as a simple, low gate count, alternative to register slice components, a brief description of such register slice components will first be provided with reference to FIGS. 1A and 1B.

FIG. 1A is a block diagram schematically illustrating a register slice 1 consisting of a register slice storage 10, and some associated control logic 20. Given a channel of information, also referred to herein as a group of signals, flowing from point A to point B, a register slice 1 can be used to insert a register between a source and destination on each of the information signals within the channel. Hence, with reference to FIG. 1A, it can be seen that a transfer request specifying as a group of separate signals an address, an indication that the request is a write transfer request, the size of the data, and information about the burst size, can be temporarily stored within the register slice storage 10 prior to propagation onto the destination. In addition to the above signals, a valid signal will typically be issued indicating whether the other signals should be treated as valid. This valid signal will be received by the control logic 20, which also receives a ready signal from the destination, for example a slave device, this ready signal being set to identify that that destination is ready to receive whatever signals are already stored within the register slice storage 10, and hence indicating that it is safe to write new data into the register slice storage 10. For example, during a particular clock cycle, the current contents of register slice storage 10 can be output to the destination, whilst new values are also stored into the register slice storage. Hence, in the event that the register slice storage 10 already contains data, the control logic 20 is used to prevent propagation of the valid signal to the register slice storage 10 until such time as a set ready signal is received, the register slice storage 10 being arranged only to store therein the received signals in the event that the valid signal is set. However, if the register slice storage does not contain any valid data, as will be indicated by the value of the valid signal output by the register slice storage, the control logic 20 need not wait for a set ready signal to be asserted before propagating the valid signal on to the register slice storage 10.

The register slice illustrated in FIG. 1A is known as a forward path register slice. FIG. 1B shows an alternative implementation of a register slice known as a fully registered register slice. In this implementation, the register slice 2 has two sets of register slice storage elements 12, 14 that are included in the main path. As will be described in more detail below, this approach allows a register 22 to also be placed in the returning ready signal path without affecting the available bandwidth through the register slice.

In situations where the return path for the ready signal is too long to traverse in a single clock cycle, the register slice implementation of FIG. 1B can be used to insert a register 22 into the return path. However, with the aim of avoiding the performance penalty that would otherwise be incurred, the control logic 20 is arranged to predict the value of the ready signal (i.e. whether it will be set or not) in the next cycle and store that predicted value in the register 22. In situations where at least one of the register slice storage elements 12, 14 is empty, the control logic is arranged to predict that the ready signal in the next cycle will be set, since even if that prediction is wrong, the register slice 2 will have capacity to store in one of the two register slice storage elements 12, 14 any signals passed to it from logic acting in dependence on that predicted value. Only if both register slice storage elements currently contain valid data signals will the control logic predict that the ready signal in the next cycle will not be set, since in that instance it would not be able to receive any further input signals if the ready signal was indeed not set.

As with the FIG. 1A example, the control logic is arranged to propagate the valid signal over path 13 or 15 to a selected one of the register slice storage elements 12, 14, respectively, in dependence on the value of the received ready signal, and may for example apply a round-robin scheme where each consecutive received set of signals is sent to a different register slice storage element (e.g. first set of signals to storage element 12, second set to storage element 14, third set to storage element 12, etc). Further, the control logic 20 controls a multiplexer 16 via control path 17, so that the signals from the appropriate one of the storage elements 12, 14 are output to ensure that the output from the register slice 2 provides the signals in the same order that they were received.

It will be appreciated that the register slices 1, 2 illustrated in FIGS. 1A and 1B have the effect of increasing the number of cycles required to pass signals from point A to point B, but with the advantage that they reduce the maximum length of path portion that must be covered in a single clock cycle, hence increasing the maximum clock frequency at which the design can operate.

However, a potential disadvantage of such register slices which was discussed earlier with reference to Table 1 is that each such register slice requires a large number of flops to be inserted within the communication path, and in certain implementations the associated cost may be considered too large. Accordingly, non-limiting, example embodiments provide a simpler mechanism for alleviating timing constraints for payload data passing over a communication channel within a data processing apparatus.

Figure 2:
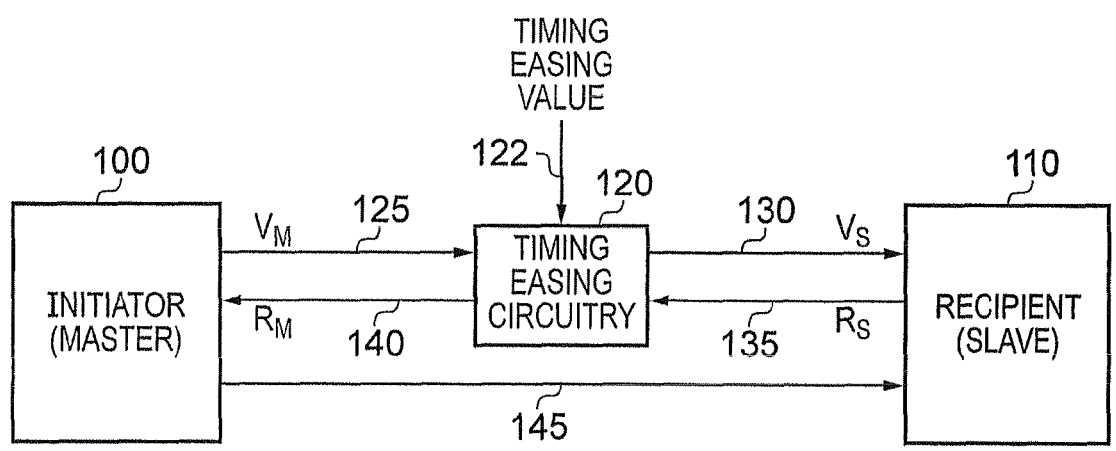
FIG. 2 illustrates a data processing apparatus in accordance with one non-limiting, example embodiment.

FIG. 2 is a block diagram illustrating a data processing apparatus in accordance with one non-limiting, example embodiment. Within the data processing apparatus, an initiator 100 is provided for initiating a transfer of data to a recipient 110 within a data processing apparatus. Each transfer will involve the routing of payload data over a communication path 145 from the initiator 100 to the recipient 110, and will also involve associated control information being routed from the initiator to the recipient and/or from the recipient to the initiator. That control information may for example identify certain attributes of the transfer, such as whether it relates to a write access, a read access, is cacheable, bufferable, etc. In addition, the control information may include handshake signals passed between the initiator 100 and the recipient 110 to control timing of receipt of the payload data by the recipient 110, such handshake signals being referred to herein as transfer control information. In one particular embodiment, a valid-ready handshake protocol is used, and accordingly a valid signal will be asserted by the initiator when the payload data is valid, and a ready signal will be asserted by the recipient when the recipient is available to receive the payload data.

Within the data processing apparatus, a transaction is initiated by a master device, and is issued to a slave device. Each transaction will typically involve multiple transfers, and in particular will involve an address transfer from the master device to the slave device, followed by one or more data transfers. For a write access, the data transfers will be passed from the master device to the slave device, whereas for a read access, the data transfers will be passed from the slave device to the master device.

For the sake of illustration, in FIG. 2 it is assumed that the transfer is passing from the master device to the slave device, and accordingly the illustrated transfer may comprise an address transfer or a write data transfer. A communication channel is provided between the initiator 100 and the recipient 110 over which the transfer takes place, that communication channel including the communication path 145 for the transfer of the payload data, and paths 125, 130, 135, 140 for the transfer of the valid and ready signals. Additionally, it will be appreciated that other communication paths may be provided within the communication channel for the passage of other control signals.

In accordance with non-limiting, example embodiments, timing easing circuitry 122 is located within the communication channel to temporarily buffer at least the valid signal issued by the initiator device 100, and optionally also to temporarily buffer the ready signal issued by the recipient 110. Hence, the initiator 100 will assert a valid signal over path 125, which when received by the timing easing circuitry 120 will then be buffered for a period of time dictated by a timing easing value received by the timing easing circuitry over path 122, whereafter the valid signal will be propagated onto the recipient 110 over path 130. Additionally, when the recipient 110 asserts a ready signal over path 135, that will be routed via the timing easing circuitry 120 and over path 140 to the initiator 100. Whilst the valid signal is being temporarily buffered by the timing easing circuitry, the timing easing circuitry will typically modify the ready signal received over path 135 so as to prevent an asserted ready signal being routed over path 140 to the initiator 100 whilst the asserted valid signal is being buffered.

Figure 3:
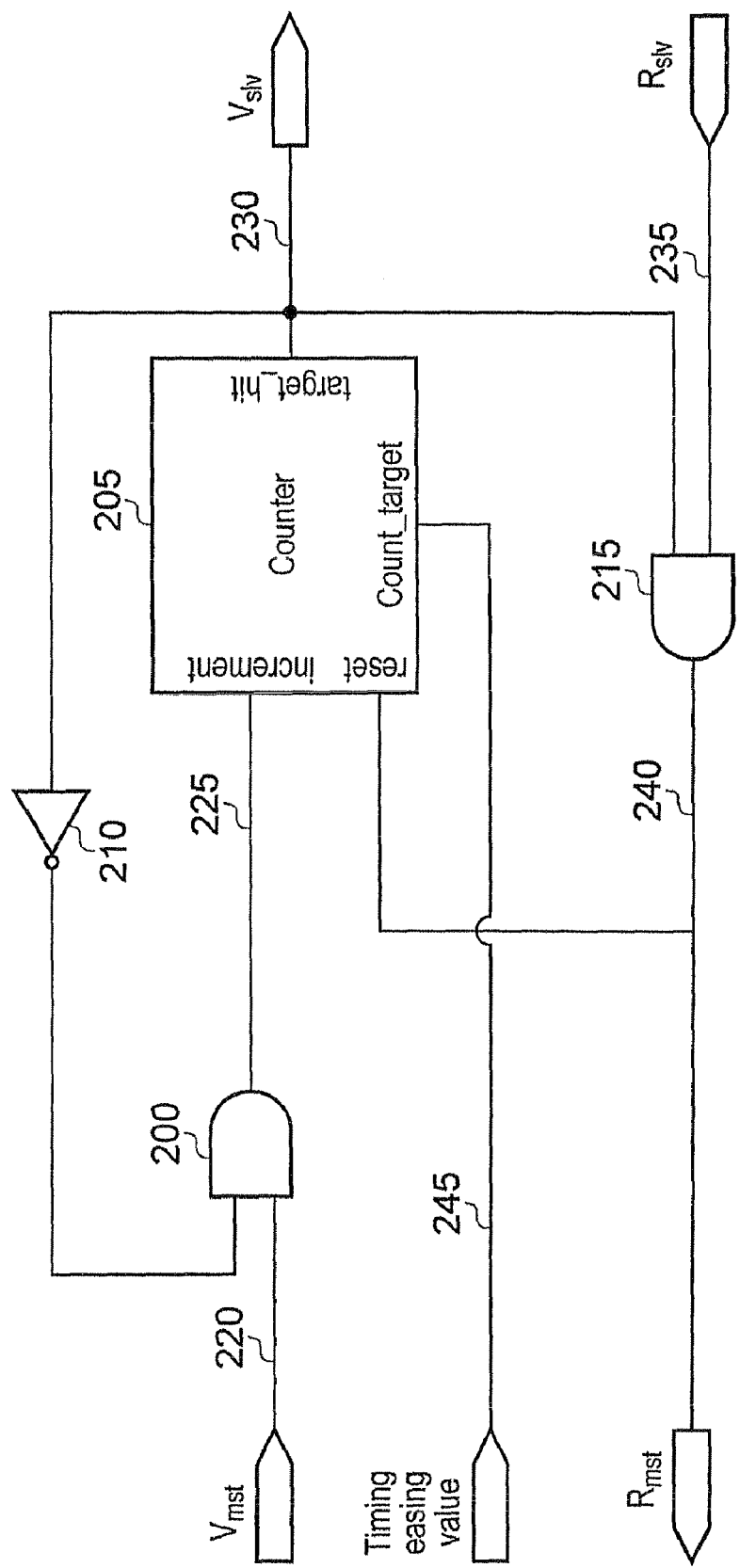
FIG. 3 is a block diagram illustrating in more detail the timing easing circuitry of FIG. 2 in accordance with one non-limiting, example embodiment.

FIG. 3 illustrates one embodiment of the timing easing circuitry 120 of FIG. 2. In accordance with this embodiment, counter circuitry 205 is provided which receives over path 245 a timing easing value, which may either be a fixed value, or may be programmable. The timing easing value specifies a count target value which the counter needs to reach prior to setting its output over path 230. For the purposes of this and the following figures, it will be assumed that an asserted valid signal or an asserted ready signal has a logic one value.

Following a reset of the counter 205, the output from the counter will initially be a logic zero value, and accordingly via inverter 210 the AND gate 200 will receive as one of its inputs a logic one value. Accordingly, when the initiator 100 asserts the valid signal over path 220, this causes a logic one value to be issued over path 225 to the counter 205 which causes the counter to start counting. Accordingly, on each iteration of the clock cycle, the counter value will be incremented, starting at a logic zero value, and comparison circuitry within the counter will then determine whether the current value of the counter has yet reached the count target value as set by the timing easing value over path 245. Until such time as the count value reaches the count target value, the output from the counter remains at a logic zero value, but once the counter value reaches the count target value, then the output from the counter is asserted at a logic one value, and accordingly the valid signal is propagated to the recipient 110 over path 230. At this point, a logic one value is received by the inverter 210, and accordingly the AND gate 200 receives as one of its inputs a logic zero value, such that a logic zero value then appears over path 225 to the counter, which stops the counter from further incrementing.

Additionally, once the output from the counter is asserted, this primes one of the inputs of the AND gate 215 to a logic one level, such that when the ready signal is asserted over path 235, this will cause the ready signal to be propagated back to the initiator over path 240. Additionally, when the ready signal is asserted over path 240, this will cause the counter 205 to be reset.

Accordingly, it can be seen that when the valid signal is asserted by the initiator 100, the counter 205 will begin counting, and the valid signal will only be propagated on to the slave device following a number of clock cycles dictated by the timing easing value. Further, whilst the counter is counting, and its output is not asserted, any ready signal issued by the recipient will be prevented from being forwarded on to the initiator via the AND gate 215, and accordingly the initiator will continue to assert the payload data since the payload data, and indeed the associated valid signal, will only be de-asserted by the initiator 100 when the initiator receives the asserted ready signal from the recipient, since it is only at that point that the initiator knows that the recipient will have sampled the payload data.

Accordingly, the timing easing value can be chosen so as to introduce one or more additional cycles of delay into the transfer of the valid signal from the initiator to the recipient, which in turn provides one or more additional cycles for the payload data to be transferred over path 145 from the initiator to the recipient, without the need for any register slice component to be inserted into the communication path 145, thus saving a significant amount of area, and associated power consumption.

Figure 4:
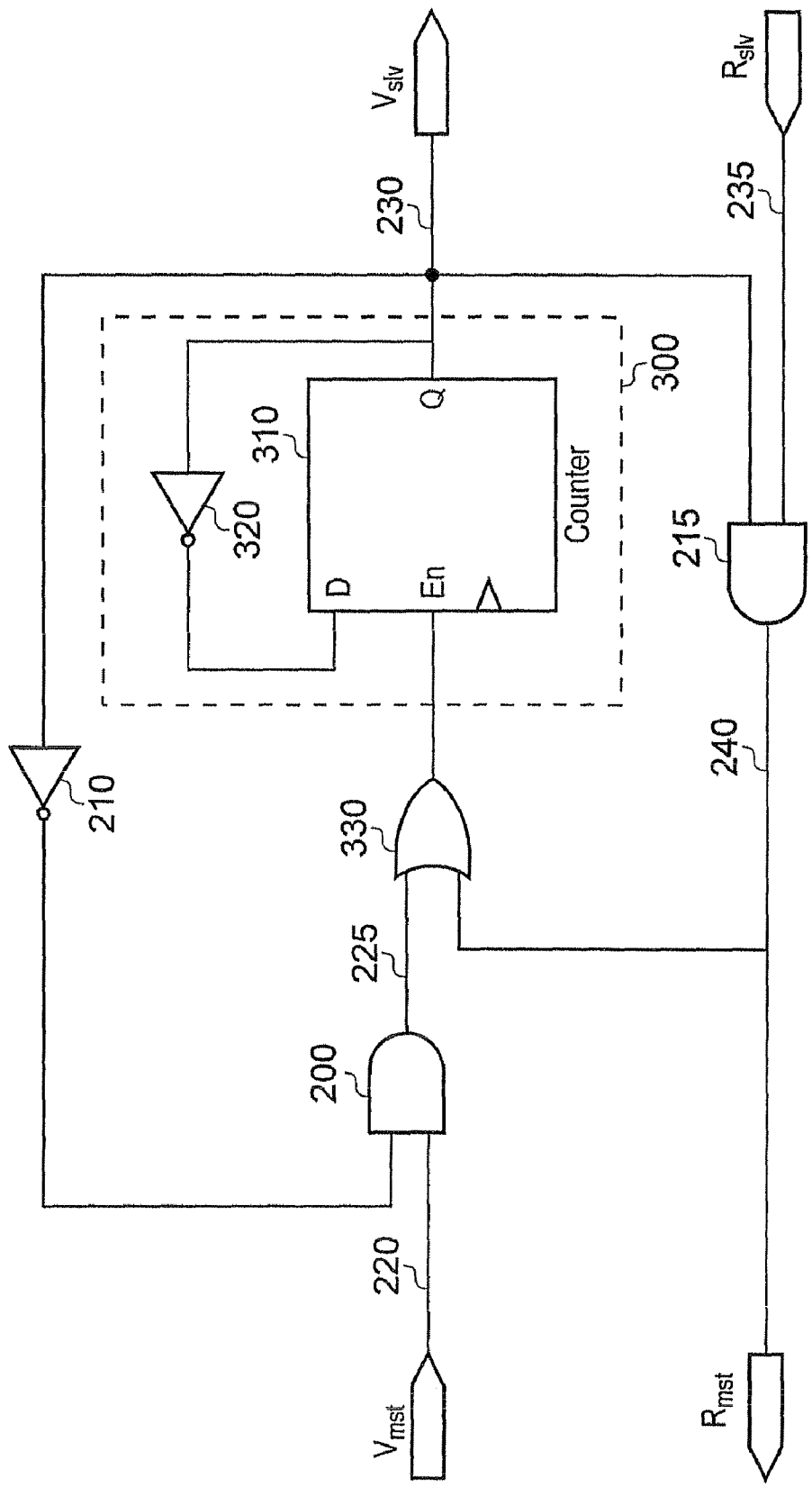
FIG. 4 is a block diagram illustrating an alternative embodiment of the timing easing circuitry of FIG. 2.

FIG. 4 illustrates an alternative embodiment for the timing easing circuitry of FIG. 3, for a particular situation where the timing easing value is predetermined to be one, i.e. one additional cycle of delay is required. In FIG. 4, those elements that are the same as the elements shown in FIG. 3 are indicated with the same reference numerals. In this embodiment, the counter 205 of FIG. 3 is replaced with the counter 300, which in essence is merely a register 310 with an inverter 320 coupling its output to its input. The register 310 is enabled whenever the AND gate 200 outputs a logic one value, which is then propagated via the OR gate 330 to the enable input of the register 310. Assuming the initial state of the register 300 is that it stores a logic zero value, and hence the output over path 230 is a logic zero value, it will be seen that the input to the register 310 is primed to a logic one value via the inverter 320. Accordingly, on receipt of an enable signal from the OR gate 330, the logic one value at the input is sampled, and the output changes to a logic one value, as a result of which the inverter 320 then primes the input to a logic zero value.

The asserted logic one value at the output 230 also primes one of the inputs to the AND gate 200 to a logic zero value via the inverter 210, so that the enable signal is then de-asserted. When a ready signal is received from the recipient 110 over path 235 at a time where the output from the counter 300 is asserted at a logic one value, then the AND gate 215 will propagate over path 240 the ready signal to the initiator 100, and will also cause the counter 300 to be re-enabled via the OR gate 330, as a result of which the output will then switch to a logic zero value and the input will be re-primed to a logic one value via the inverter 320. Similarly, the first input to the AND gate 200 will at that time be re-primed to a logic one value via the inverter 210.

Accordingly, for the particular case where one additional cycle of delay is to be added, then the counter and associated comparator circuitry 205 of FIG. 3 can be replaced by the simple register 310 and inverter 320 of FIG. 4, and accordingly it will be seen that the embodiment of FIG. 4 is particularly simple, cheap and power efficient when compared with the known prior art technique of inserting a register slice across the entire communication channel.

To contrast with the register slice of the known prior art techniques, the timing easing circuitry 120 will also be referred to herein as a timing slice, since it merely temporarily buffers the valid signal (and optionally the ready signal) in order to alleviate timing constraints over the communication channel.

Figure 5:
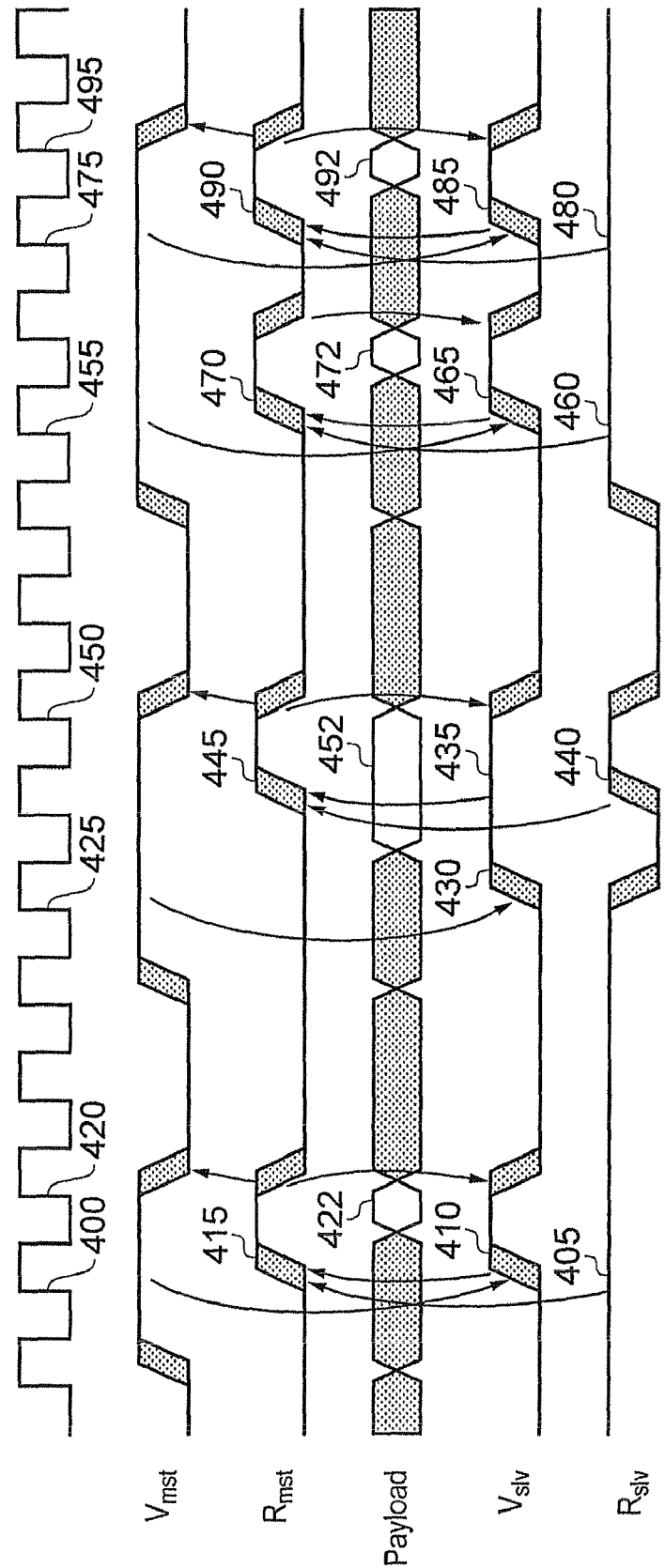
FIG. 5 is a timing diagram illustrating the values of the various signals shown in FIGS. 3 and 4 assuming a timing easing value of one.

FIG. 5 is a timing diagram illustrating the values of the various valid and ready signals shown in FIG. 4, or in FIG. 3 in the situation where the timing easing value is set to one. As shown in FIG. 5, when the valid signal issued by the master is asserted, it is not initially output as the valid slave signal over path 230, and instead the counter is merely triggered to begin counting to the specified timing easing value. On the sampling edge 400, the value of the timing easing value, in this example 1, will have been reached, and accordingly the valid slave signal is asserted at point 410. At this time, the presence of the asserted ready slave signal at point 405 in combination with the asserted valid slave signal at point 410 causes the ready master signal to be asserted at point 415 via AND gate 215. On the following sampling edge 420, the payload data 422 is sampled, and the presence of the asserted ready master signal enables the master to de-assert the valid master signal and de-assert the payload data. Meanwhile, the asserted ready master signal will also have been used to re-set the counter, and accordingly cause the valid slave signal to be de-asserted.

The points 425, 430, 435, 440, 445, 450, 452 shown in the middle part of FIG. 5 show a similar sequence of events, but in this instance at the time the valid slave signal is asserted at point 430, the ready signal from the slave is not asserted, and accordingly it is only when the ready slave signal is subsequently asserted at point 440 in the presence of the asserted valid slave signal at point 435 that the ready master signal is then asserted at point 445. Again, the payload data 452 is then sampled on the sampling edge 450 at which time the valid master signal and valid slave signal are de-asserted.

The right-hand side of FIG. 5 shows a sequence where two transfers of payload data 472, 492 occur in succession, and accordingly the master 100 does not de-assert the valid signal when it observes the ready master signal over path 240. Hence, the sequence of events indicated by points 455, 460, 465, 470, 472 correspond with the earlier-described events 400, 405, 410, 415, 422, but the valid signal is not de-asserted. Instead, the valid signal continues to be asserted but because the counter has been reset by the asserted ready master signal, an additional delay of one clock cycle is introduced before the sampling edge 475 is reached, whereupon the valid slave signal can again be asserted at point 485. The sequence of events indicated by the points 475, 480, 485, 490, 492, 495 then correspond with the earlier-mentioned points 400, 405, 410, 415, 422, 420. From the right-hand side of FIG. 5, it can be seen that the mechanism provided by the counter of FIG. 4 forces every transfer to take two cycles and hence for burst transfers this can cause a slight performance degradation when compared with a register slice implementation. However, compared with the size of such a register slice implementation, it is clear that the timing slice approach illustrated with reference to FIGS. 3 and 4 requires significantly less flops, and accordingly takes up less area and consumes less power.

Figure 6:
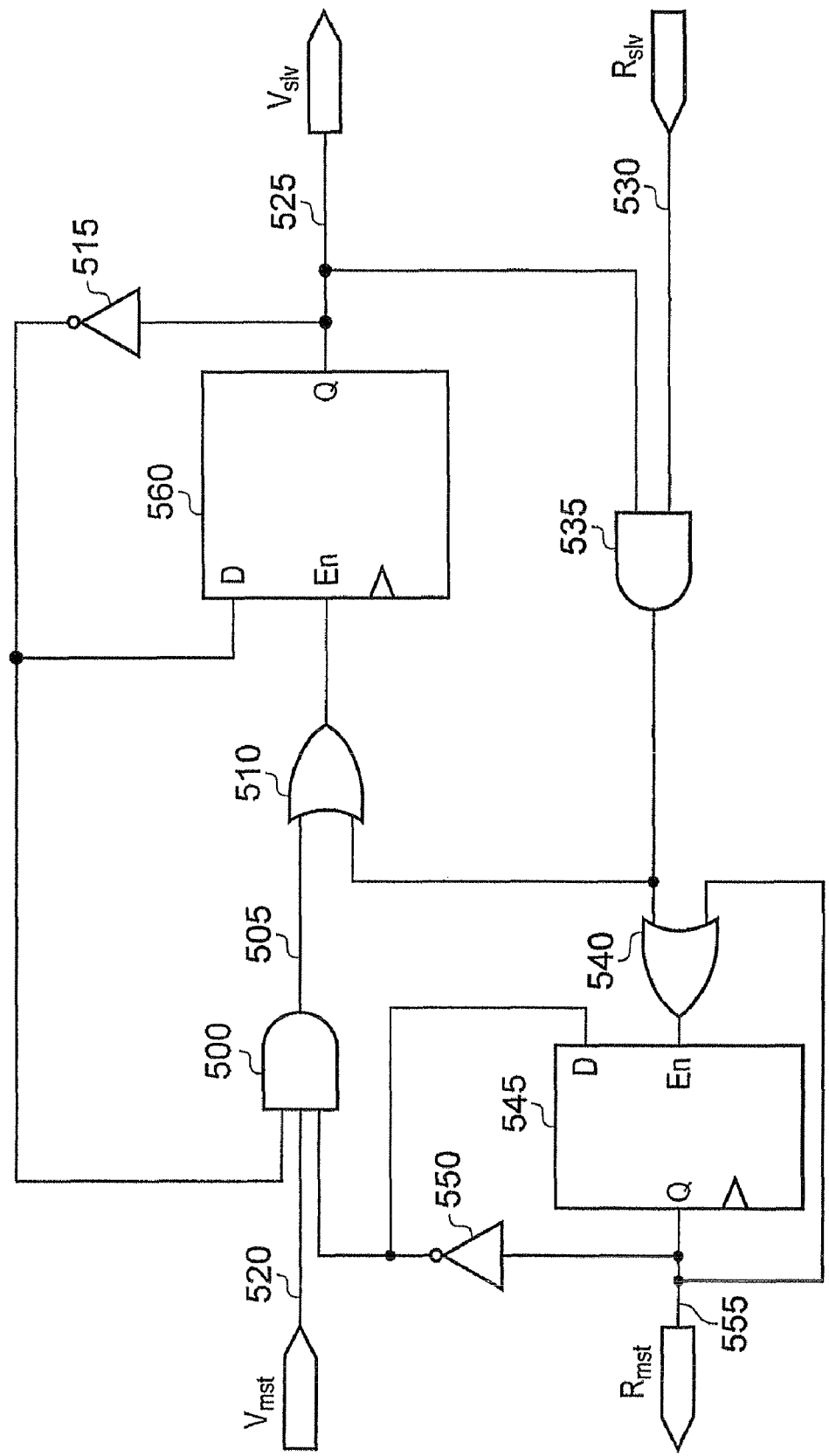
FIG. 6 is a block diagram illustrating an alternative embodiment of the timing easing circuitry of FIG. 2.
Figure 7:
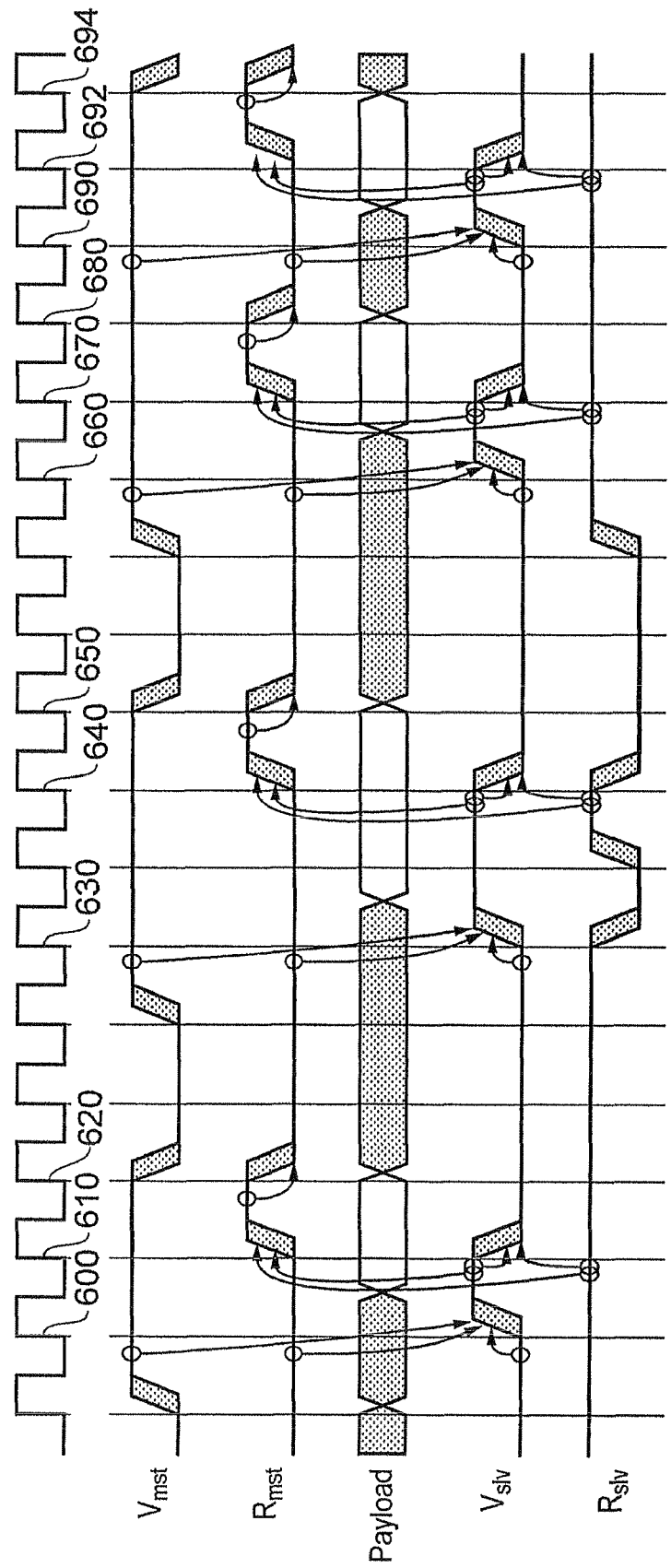
FIG. 7 is a timing diagram illustrating the values of the various signals shown in FIG. 6.

FIG. 6 illustrates an alternative embodiment of timing easing circuitry 120 that can be used instead of the circuitry of FIG. 4 in situations where it is desired to provide an alternative for the fully registered register slice illustrated earlier with reference to FIG. 1B. Further, FIG. 7 is a timing diagram providing an illustration of how the various valid and ready signals change when employing the circuitry of FIG. 6, for the same sequence of events as discussed earlier with reference to the timing diagram of FIG. 5.

As can be seen from a comparison of FIGS. 4 and 6, elements 500, 510, 560, 515 and 535 correspond to the elements 200, 330, 310, 320, 210 and 215 of FIG. 4 (the single inverter 515 of FIG. 6 replaces the two inverters 320 and 210 of FIG. 4). In addition further circuitry 540, 545 and 550 is provided to temporarily buffer the ready signal as will now be described in more detail with reference to both FIGS. 6 and 7.

When the register 560 is initialized it stores a logic zero value and accordingly via inverter 515 its D input is primed to a logic one value, as is a first input to the AND gate 500. When the valid master signal is asserted by the initiator 100 over path 520 whilst the ready master signal on path 555 is not asserted, then this causes all three inputs to the AND gate 500 to be asserted, and accordingly at clock edge 600 this causes a logic one value to be propagated to the enable input of the register 560 via the OR gate 510, as a result of which the logic one value at the register's D input is sampled, causing the valid slave signal to be asserted over path 525. At this point the inverter 515 causes the D input of the register 560 to be primed to a logic zero value, and also the first input of the AND gate 500 returns to a logic zero level, causing the enable signal to be de-asserted.

Assuming the ready slave signal is asserted on path 530, then at clock edge 610, the presence of both the asserted valid slave signal on path 525 and the asserted ready slave signal on path 530 will cause a logic one signal to be output by AND gate 535 and on to the enable input of register 545 via the OR gate 540. This will cause the logic one value at the D input of that register to be sampled, thereby causing the ready master signal to be asserted over path 555. Also, via OR gate 510 the enable input of register 560 will be set to cause the value of the valid slave signal to be returned to a logic zero level.

At clock edge 620 the payload data is sampled, and the presence of the asserted ready master signal over path 555 will again cause the enable input of the register 545 to be set via the OR gate 540. Hence this will cause the zero value at the D input to be sampled, and accordingly will cause the ready master signal to be de-asserted.

As can be seen from a comparison of FIG. 5 with FIG. 7, the registering of the ready slave signal within the timing easing circuitry adds an additional cycle of latency to each transfer and hence the ready master signal is asserted one cycle later than would be the case when compared with the timing diagram of FIG. 5. However, the space saving and power saving benefits achievable using such an approach are very significant when compared with the fully registered register slice implementation of FIG. 1B.

The middle part of FIG. 7 shows the same sequence of events as in the middle part of FIG. 5, and hence at the clock edge 630 where the valid slave signal is asserted, the ready slave signal is de-asserted. Accordingly only at clock edge 640 are the conditions present for the ready master signal to be asserted and the valid slave signal to be de-asserted. The payload data is then sampled on the rising edge 650.

The right hand side of FIG. 7 shows the same sequence of events as in the right-hand side of FIG. 5, where two transfers of payload data occur in succession, and accordingly the initiator 100 does not de-assert the valid signal between transfers. Each transfer takes three cycles, with the ready slave signal staying asserted throughout the period of the two transfers.

Figure 8:
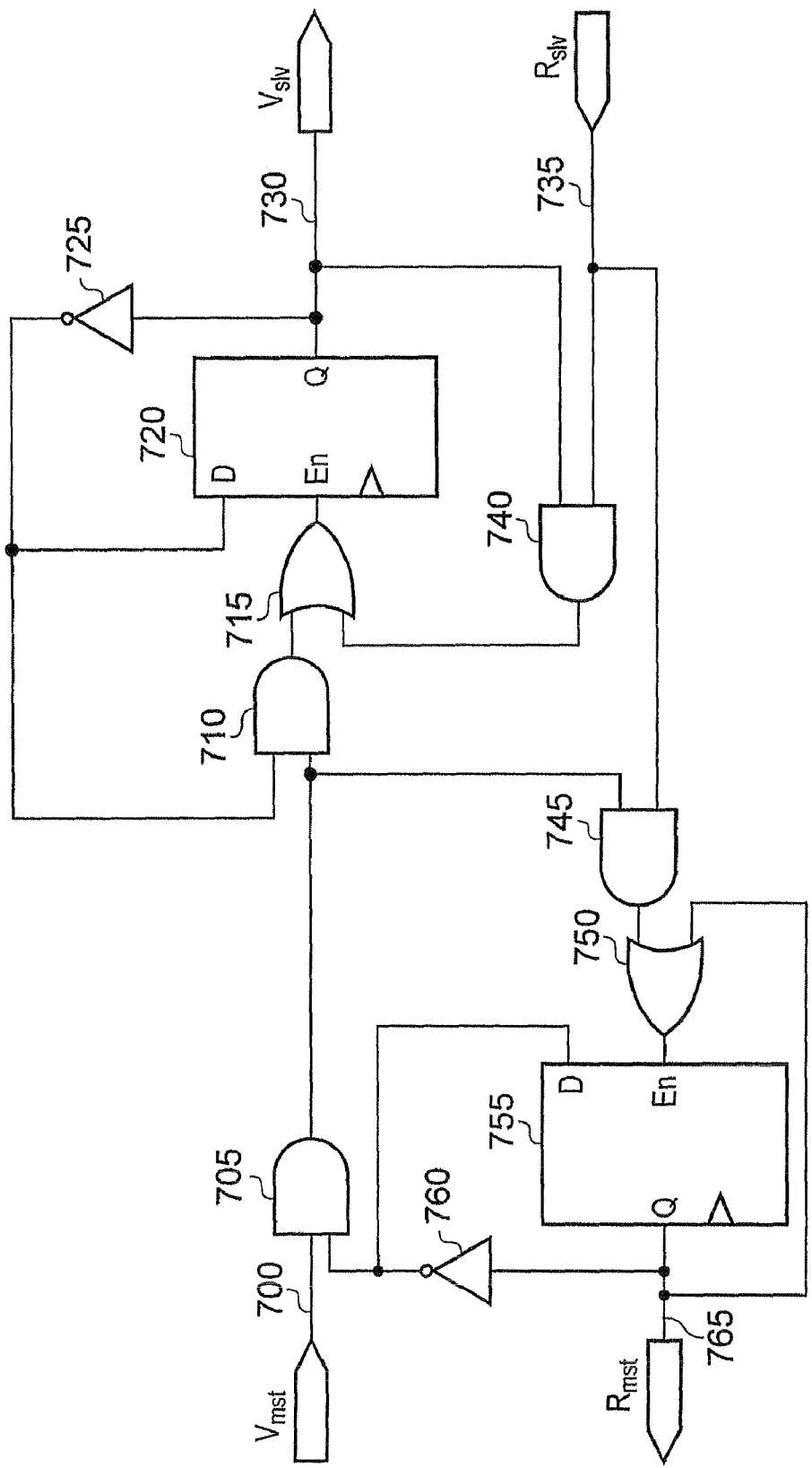
FIG. 8 is a block diagram illustrating an alternative embodiment of the timing easing circuitry of FIG. 2.
Figure 9:
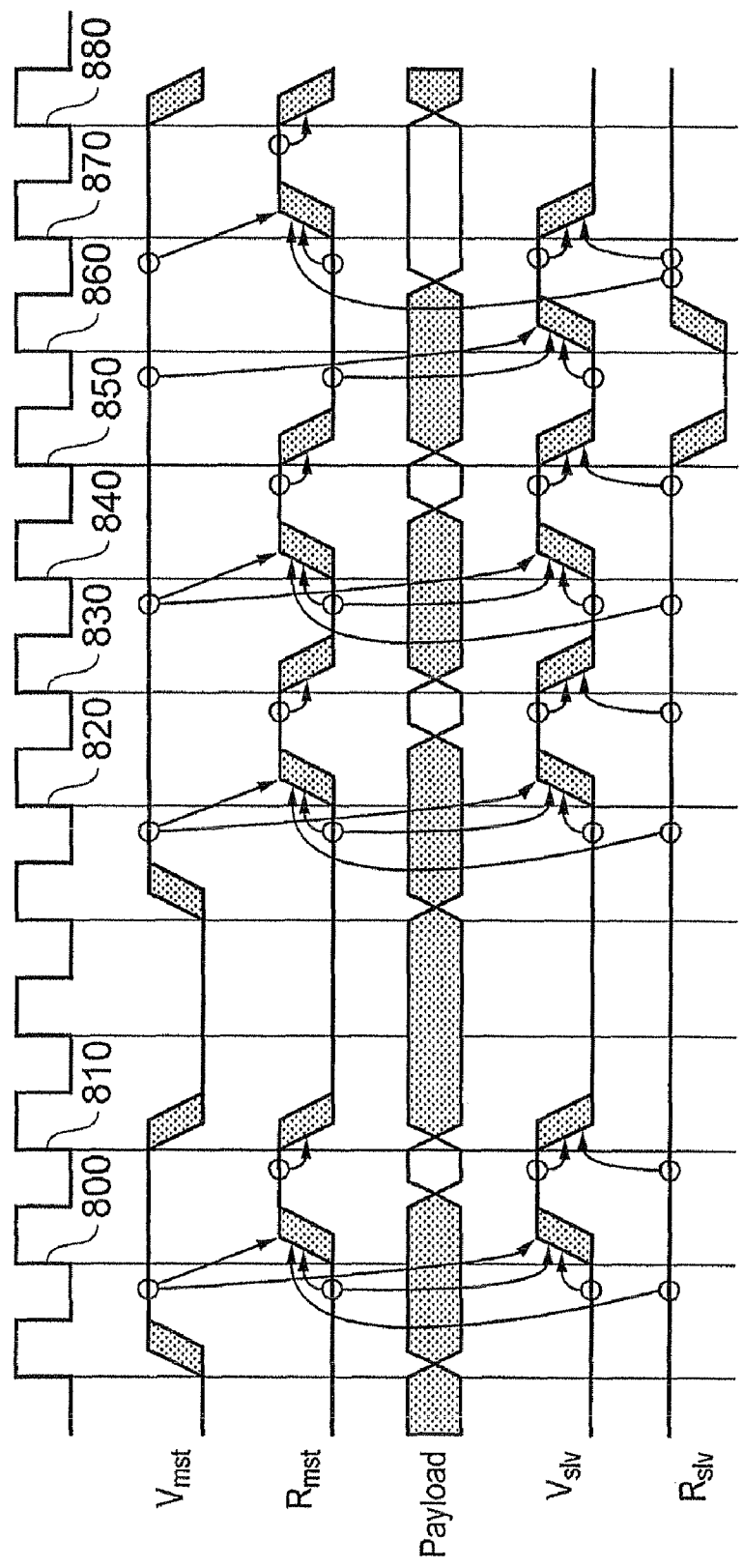
FIG. 9 is a timing diagram illustrating the values of the various signals shown in FIG. 8.

FIG. 8 shows an alternative embodiment for the timing easing circuitry shown in FIG. 6 in situations where the ready signal issued by the slave can be arranged to be a sticky ready signal, i.e. the slave component once it has asserted the ready signal will not de-assert the ready signal until it receives the valid slave signal. Further FIG. 9 is a timing diagram for the timing easing circuitry of FIG. 8, showing firstly a single transfer, and then a sequence of transfers. It should be noted that the scenario envisaged by the middle part of FIGS. 5 and 7 will not occur in this embodiment, due to the sticky nature of the ready signal issued by the slave.

As can be seen from a comparison of FIGS. 6 and 8, elements 705, 710, 715, 720, 725 and 740 of FIG. 8 correspond to the elements 500, 510, 560, 515 and 535 of FIG. 6 (the single three input AND gate 500 of FIG. 6 has been replaced in FIG. 8 by the two two-input AND gates 705, 710). In addition the further circuitry 540, 545 and 550 of FIG. 6 corresponds to the further circuitry 750, 755, 760 of FIG. 8, which as in FIG. 6 is provided to temporarily buffer the ready signal. The embodiment of FIG. 8 will now be described in more detail with reference to the timing diagram of FIG. 9.

When the register 720 is initialized it stores a logic zero value and accordingly via inverter 725 its D input is primed to a logic one value, as is a first input to the AND gate 710. When the valid master signal is asserted by the initiator 100 over path 700 whilst the ready master signal on path 765 is not asserted, then this causes the AND gate 705 to output a logic one value, which in turn causes the AND gate 710 to output a logic one value. Accordingly at clock edge 800 this causes a logic one value to be propagated to the enable input of the register 720 via the OR gate 715, as a result of which the logic one value at the register's D input is sampled, causing the valid slave signal to be asserted over path 730. At this point the inverter 725 causes the D input of the register 720 to be primed to a logic zero value, and also the first input of the AND gate 710 returns to a logic zero level, causing the enable signal to be de-asserted.

If at rising clock edge 800 the ready slave signal is also asserted on path 735, as is shown in the example of FIG. 9, then AND Gate 745 will output a logic one value on to the enable input of register 755 via the OR gate 750. This will cause the logic one value at the D input of that register to be sampled, thereby causing the ready master signal to be asserted over path 765.

At clock edge 810 the payload data is sampled, and the presence of the asserted ready master signal over path 765 will again cause the enable input of the register 755 to be set via the OR gate 750. Hence this will cause the zero value at the D input to be sampled, and accordingly will cause the ready master signal to be de-asserted. Also at clock edge 810, the presence of both the asserted valid slave signal on path 730 and the asserted ready slave signal on path 735 will cause a logic one signal to be output by AND gate 740. Hence, via OR gate 715, the enable input of register 720 will be set to cause the value of the valid slave signal to be returned to a logic zero level.

Due to the sticky nature of the ready signal, the timing of the assertion of the ready master signal can be brought forward one clock cycle when compared with the timing diagram of FIG. 7, and hence the ready signal can be temporarily buffered within the timing easing circuitry without any increase in latency added as a result of buffering the ready signal. Instead, it can be seen that the timing corresponds generally with that discussed earlier with reference to the left-hand side of the FIG. 5 timing diagram.

The right hand side of FIG. 9 shows a similar sequence of events as in the right-hand side of FIGS. 5 and 7, but in this example three transfers of payload data occur in succession, with the initiator 100 not de-asserting the valid signal between transfers. The transitions occurring at clock edges 820, 830 and 840, 850 correspond to those discussed earlier with reference to clock edges 800, 810. However, the sequence of the third transfer is slightly different due to the ready slave signal having been de-asserted by clock edge 860. Although the ready slave signal is sticky it can de-asserted following receipt of the valid slave signal, and hence can be arbitrarily de-asserted following clock edge 850.

As a result, whilst at clock edge 860 the valid slave signal is asserted, the conditions are not at that time in place to cause the ready master signal to be asserted. This only happens one cycle later at clock edge 870 by which point the ready slave signal has been re-asserted. Also at clock edge 870, the valid slave signal is de-asserted given the presence of the asserted valid slave signal and asserted ready slave signal. One cycle later, at clock edge 880, the payload is sampled, and the ready master signal is de-asserted, after which the valid master signal can be arbitrarily de-asserted.

As can be seen, the first two transfers in the sequence take two clock cycles each, replicating the timing of the FIG. 5 example, whilst the third transfer takes three cycles due to the delay caused by the de-asserted ready slave signal.

Figure 10:
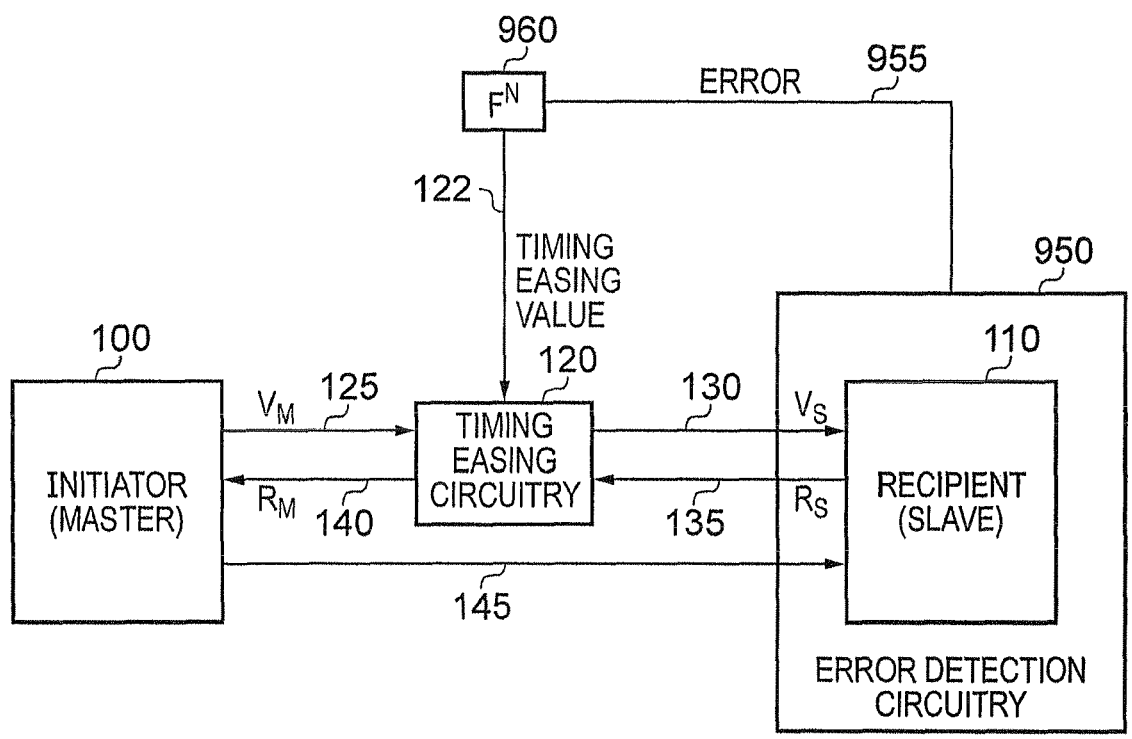
FIG. 10 illustrates an alternative embodiment of the circuitry of FIG. 2 which enables errors to be detected and changes to the timing easing value to be made dependent on the errors.

FIG. 10 illustrates an alternative embodiment for the circuitry of FIG. 2, where error detection circuitry is included in association with the recipient 110. In particular, error detection circuitry 950 is provided in association with the recipient

110. As discussed earlier, one way to implement such error detection circuitry is to use an input register within the recipient 110 to sample a signal, and then to sample the same signal a small time later and determine whether there is any different between the two signals. Such a technique is described in co-pending US Publication No. US2004-0199821. If the values are different, this indicates an error, and the error detection circuitry may be provided with a mechanism for recovering from that error. In addition, in accordance with example embodiments, the error detection circuitry 950 can in such situations output an error signal which can be used to vary the timing easing value provided over path 122 to the timing easing circuitry 120. In particular, the error detection circuitry 950 can output an error signal over path 955 which is received by a function 960 used to determine the appropriate timing easing value to provide to the timing easing circuitry 120 over path 122. Hence, such a feedback mechanism enables the timing easing value to be increased in situations where errors are detected in the sampling of the signal by the recipient 110, to thereby further ease the timing constraints having regards to the setup requirements of the recipient 110.

The function 960 may be implemented in hardware, or may be a software-based function for determining the timing easing value.

For the sake of ease of illustration, the earlier-described FIG. 2 (and likewise FIG. 10) illustrated a simple point-to-point connection between an initiator 100 and a recipient 110. However, in many systems, such simple point-to-point connections will not be provided.

Figure 11:
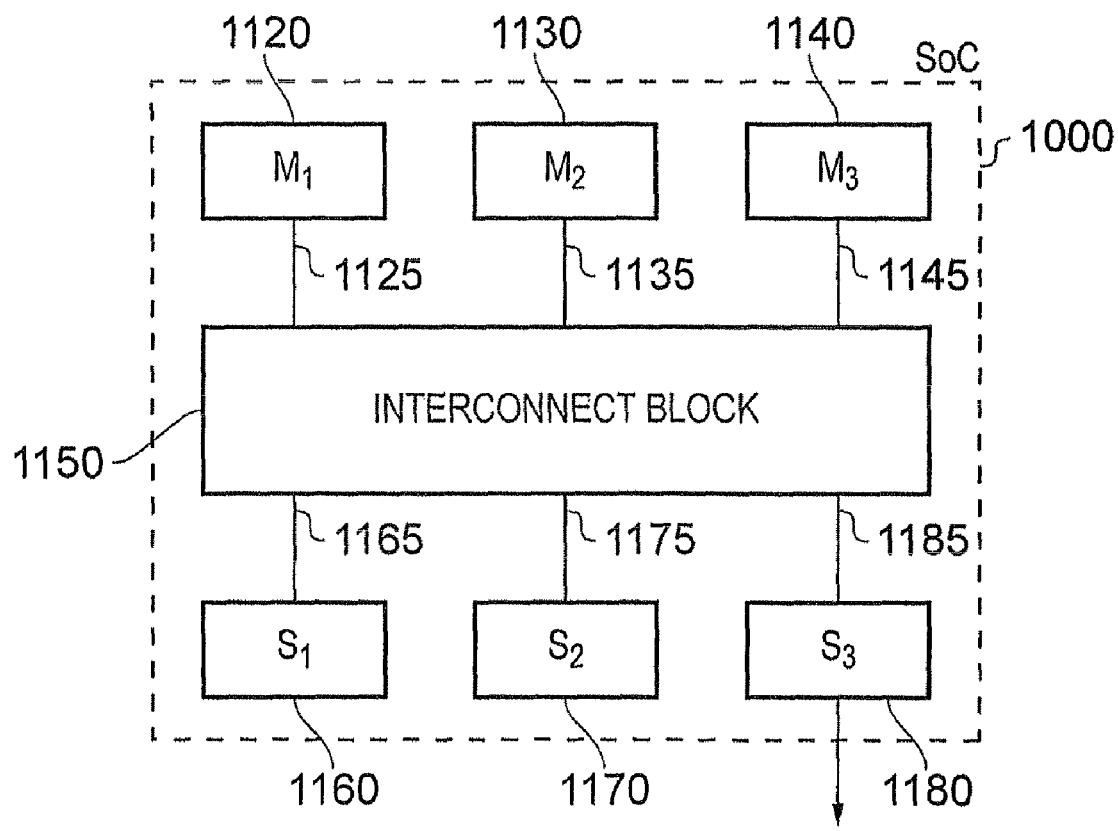
FIG. 11 is a block diagram illustrating the use of a bus interconnect block within the data processing apparatus.

For example, FIG. 11 illustrates a data processing apparatus in the form of a System-on-Chip (SoC), which may be used within a device such as a personal organizer, a mobile phone, a television set-top box, etc. The SoC design 1000 has a plurality of components 1120, 1130, 1140, 1160, 1170, 1180 that are interconnected by an arrangement of buses. The actual interconnection of these buses is specified within an interconnect block 1150. The interconnect block 1150 includes a matrix of connections which provide for the interconnection of multiple bus master devices and bus slave devices within the SoC 1000. Hence, each master device 1120, 1130, 1140 may be connected to corresponding buses 1125, 1135, 1145, respectively, whilst each slave device 1160, 1170, 1180 may also be connected to corresponding buses 1165, 1175, 1185, respectively, with the interconnect block 1150 defining how these various buses are interconnected.

Accordingly, it will be appreciated that the interconnect block 1150 will describe a complex arrangement of interconnections between various master and slave devices. This complex arrangement may include a number of unidirectional communication channels over which transfers can be passed. In accordance with one embodiment which will now be discussed with reference to FIG. 12, a methodology and tool are provided which provide for the selective placement of timing slices (i.e. the timing easing circuitry 120 of FIG. 2) within the bus interconnect block in order to seek to meet timing requirements of the bus interconnect block.

Figure 12:
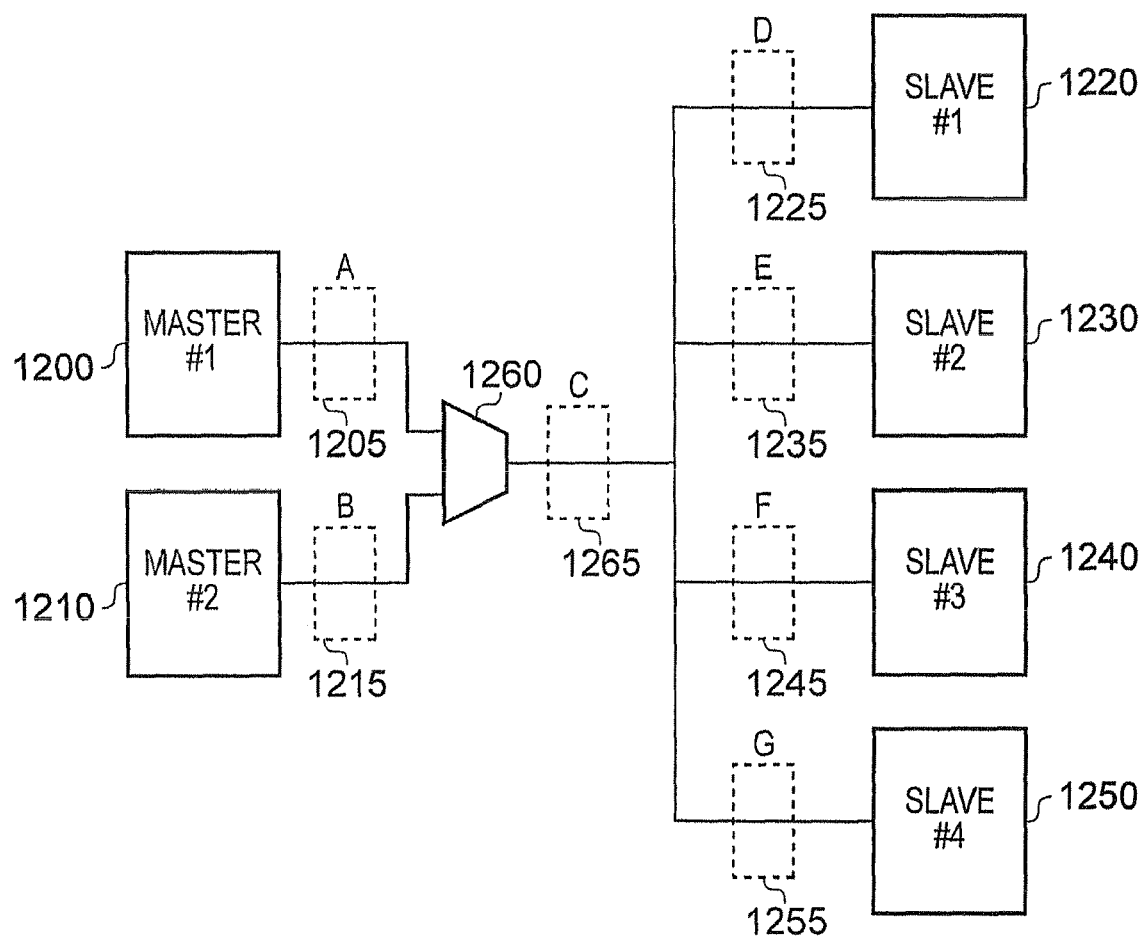
FIG. 12 is a block diagram illustrating possible placements of timing easing circuitry within a bus interconnect block in accordance with one embodiment.

FIG. 12 illustrates a two master and four slave system with a bus interconnect block located there between. The bus interconnect block of FIG. 12 has been kept simple for ease of illustration, but it will be appreciated that in typical embodiments the bus interconnect block will be significantly more complex than the arrangement shown in FIG. 12. As can be seen from FIG. 12, a number of paths are provided by the bus interconnect block to enable the master one 1200 or master two 1210 to communicate with any of the four slave devices 1220, 1230, 1240, 1250. When a transaction is initiated by the master devices, an arbiter will typically be used in order to determine which master should be granted access to the slave devices, and that arbiter will then send a control signal to the multiplexer 1260 to control which transaction is output to the slave devices. For clarity, only the address channel is shown in FIG. 12, but it will be appreciated that other communication channels will also be provided in both directions between the master and the slave devices, for example to support write data transfers and read data transfers.

The boxes with dashed outlines 1205, 1215, 1225, 1235, 1245, 1255 and 1265 show a number of potential sites for a timing slice. It can be seen that the site 1265 is a common site as it intercepts the path between all master and slave devices. A timing slice in this location would effectively allow the timing constraints introduced by the combinatorial delays of the bus level multiplexer 1260 to be eased in respect of all paths to the various slave devices 1220, 1230, 1240, 1250.

The use of timing slices at other locations within the bus interconnect block can also assist in improving timing characteristics. For example, it may be determined that it is appropriate to consider introducing a timing slice in a path via which the bus interconnect block receives signals from master or slave devices, for example the path between master two 1210 and any storage element provided within the interconnect block. It can then be determined whether the setup time taken to receive the signals exceeds a predetermined threshold. It will be appreciated that a certain amount of the clock cycle will be required in order for the master or slave device to validly assert the signals, this leaving only a portion of the clock period available for use in receiving the signals by the bus interconnect block. If the setup time taken to receive the signals exceeds that available time, then a timing slice could be inserted at that point in order to ease the timing requirements and allow a multi-cycle path to be provided for the transfer of the payload data to the receiving storage element within the interconnect block. Hence, for example, it may be decided to introduce a timing slice at the site 1215, and a timing slice at that location would hide any large output delays from master two 1210.

Additionally, it may be determined that it is appropriate to consider introducing a timing slice into a path via which the bus interconnect block outputs signals to master or slave devices, for example a path between slave device four 1250 and some internal storage element within the bus interconnect block. Then, it can be determined for any such path whether the time taken to output valid signals from the bus interconnect block exceeds a predetermined threshold. It will be appreciated that only a certain portion of the clock period will be available to the interconnect block for it to validly assert output signals, in order to leave sufficient time for the recipient device to then validly receive those signals. Accordingly, if it is determined that the time taken to output valid signals exceeds that allowable time, it may be considered appropriate to insert a timing slice in that candidate path to convert the path into a multi-cycle path thereby easing the timing constraints. Hence, as an example, it may be decided to insert a timing slice at site 1255, in order to hide large input setup requirements of the slave device four 1250.

Figure 13:
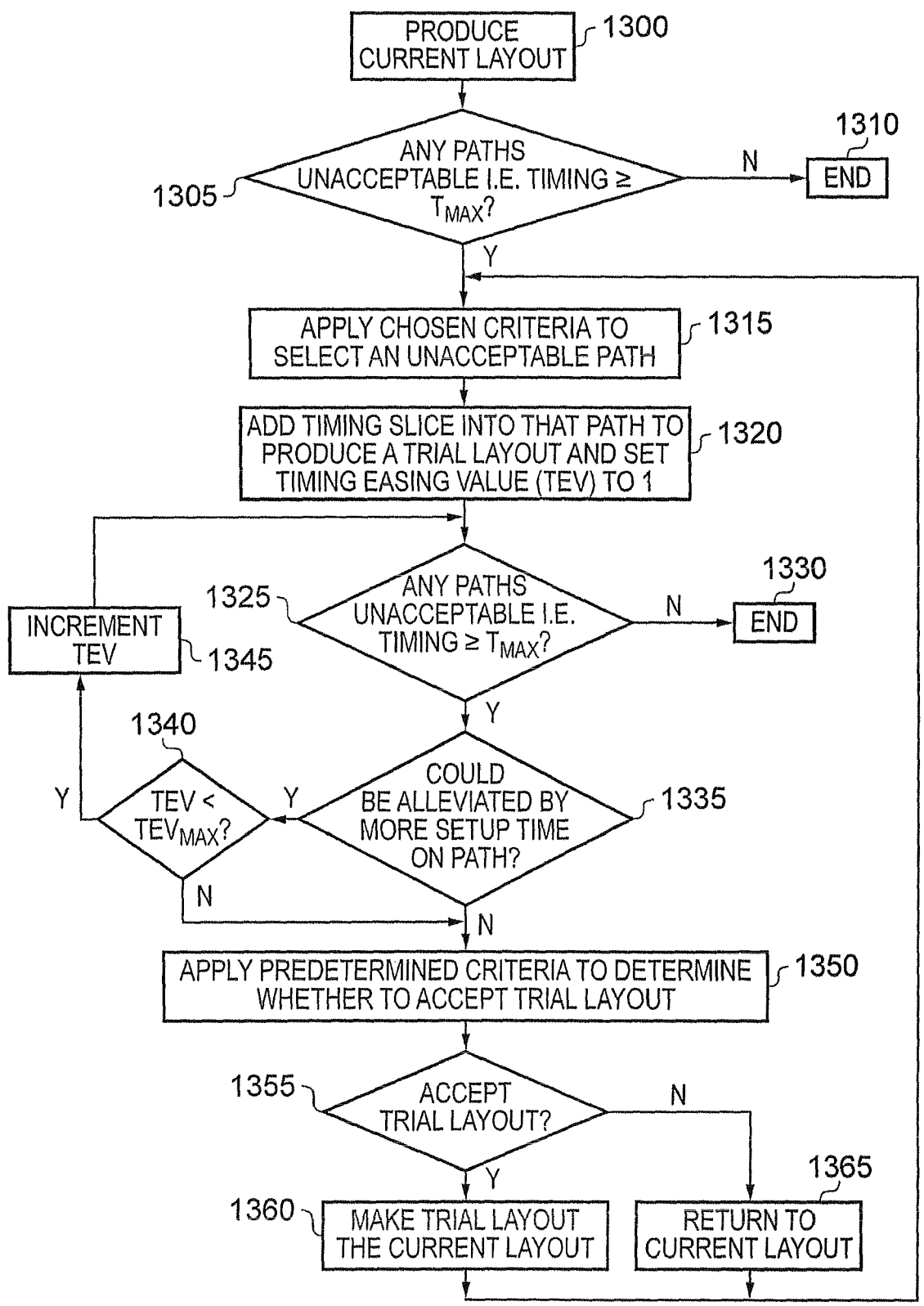
FIG. 13 is a flow diagram illustrating a technique employed in order to determine whether it is appropriate to insert timing easing circuitry in particular paths in accordance with one non-limiting, example embodiment.

FIG. 13 schematically illustrates a process that may be performed at the layout stage of design in order to determine whether to introduce new timing slices into the design. At step 1300, a current layout is produced based on the current design. Then, at step 1305 it is determined whether any of the paths are unacceptable, i.e. whether any of the paths include path portions where the time taken for signals to traverse those path portions is greater than the clock cycle period $T_{MAX}$. If not, no corrective action is required, and the process ends at step 1310. However, assuming that there are some unacceptable paths, the process proceeds to step 1315, where chosen criteria are applied to select an unacceptable path. It will be appreciated that there are a number of ways in which this could be done. For example, the unacceptable path whose timing is the longest, i.e. the most unacceptable, could be selected, or alternatively the selection could be made at random.

Thereafter, the process proceeds to step 1320, where a timing slice is added into the path to produce a trial layout, and the timing easing value for that timing slice is set equal to one. Thereafter, at step 1325 it is determined whether there are now any paths within the interconnect block that are still unacceptable. Clearly the addition of a timing slice into the unacceptable path selected at step 1315 will improve the timing characteristic of that path, although it may still be an unacceptable path. Further, there may well be other unacceptable paths still in the system, and indeed it is possible that the introduction of such a timing slice, with any accompanying movement in the layout design, may have a knock-on adverse effect on some other path's timings.

If it is determined at step 1325 that there are no unacceptable paths remaining in the interconnect block, then the process ends at step 1330, but otherwise the process proceeds to step 1335, where it is determined whether the unacceptable timing could be alleviated by more setup time on the path selected at step 1315. If the unacceptable timing paths are on the payload signals (that is, any of the signals except the valid and ready handshake signals), then increasing the setup time by increasing the timing easing value may alleviate the timing problems. If however there are unacceptable timing paths on either of the valid or ready signals then increasing the setup time will not help (and it may be appropriate to consider adding further timing slices on the paths that fail the timing requirements).

Assuming it is determined at step 1335 that more setup time on the path could alleviate the timing problems, then at step 1340 it is determined whether the current timing easing value is less than a predetermined maximum timing easing value. If so, the timing easing value is incremented at step 1345, and the process returns to step 1325. By increasing the timing easing value, and hence introducing a further cycle into the associated path, it is possible that this may resolve the remaining timing issues, and accordingly it may now be concluded at step 1325 that there are no paths remaining with unacceptable timing, which would enable the process to end at step 1330.

However, if at step 1335, it is determined that more set up time will not be able to resolve the timing issue, or it is determined at step 1340 that the maximum timing easing value has been reached, the process proceeds to step 1350, where a predetermined criteria is applied to determine whether to accept the trial layout in preference to the current layout. It will be appreciated that a number of criteria could be used to make this decision. For example it may be decided to accept the trial layout if the longest unacceptable path (i.e. that with the longest timing) in the trial layout has a timing which is less than the longest unacceptable path in the current layout. Alternatively, or in addition, consideration could be given to the total number of unacceptable paths in the trial layout as compared with the total number of unacceptable paths in the current layout. It will be appreciated that various other criteria could be taken into account when determining whether the trial layout provides improved timing characteristics when compared with the current layout.

Following the application of the predetermined criteria at step 1350, it is then determined at step 1355 whether to accept the trial layout based on the determination resulting from the application of the predetermined criteria. If the trial layout is to be accepted, the process proceeds to step 1360 where the trial layout becomes the new current layout, whereafter the process returns to step 1315 to cause a further unacceptable path to be selected. If at step 1355 it is decided that the trial layout is not to be accepted, then the process branches to step 1365 where the trial layout is discarded, and instead the previous current layout is used, whereafter the process proceeds to step 1315 to cause a different unacceptable path to be selected. It will be appreciated that the chosen criteria applied at step 1315 will typically keep track of previous unacceptable paths selected but considered not to produce an improvement in timing characteristics of the overall bus interconnect block.

When adding timing slices into the design, it will be appreciated that the layout may have to be modified to provide room for the insertion of the timing slices. However, when compared with the known prior art approach of inserting register slices, which are significantly larger than the timing slices envisaged by non-limiting, example embodiments, it will be appreciated that timing slices can more readily be added at this stage in the design than may be the case for equivalent register slices. In addition, due to the programmability of the timing easing value, the process of FIG. 13 provides more than just the selective introduction of a timing slice, but also allows the timing easing value associated with such a timing slice to be varied with the aim of seeking to remove any unacceptable timing in the communication paths provided by the interconnect block.

From the above described non-limiting, example embodiments, it will be appreciated that the timing easing circuitry of such embodiments seek to modify the handshake mechanism so as to extend the timing allowed for transfer of payload data between an initiator and a recipient. In particular, through use of the timing easing circuitry, a multi-cycle path can be established between an initiator and a recipient for the transfer of payload data without the need to insert a register slice into that path.

Although particular non-limiting, example embodiments have been described herein, it will be apparent that the claims are not limited thereto, and that many modifications and additions may be made within the scope of the invention.

We claim:

1. A data processing apparatus comprising:
   initiator circuitry configured to initiate a transfer of payload data in a first clock cycle;
   recipient circuitry configured to receive the payload data the subject of the transfer in a later clock cycle;
   a communication channel configured to pass the payload data from the initiator circuitry to the recipient circuitry via a payload path, the communication channel further configured to pass transfer control information associated with the transfer between the initiator circuitry and the recipient circuitry via a transfer control information path, timing of receipt of the payload data by the recipient circuitry being controlled by the transfer control information; and
   timing easing circuitry located within the transfer control information path of the communication channel configured to temporarily buffer at least the transfer control information generated by the initiator circuitry before outputting that transfer control information to the recipient circuitry, the timing easing circuitry configured to be responsive to a specified timing easing value to determine a time for which that transfer control information is temporarily buffered before being output to the recipient circuitry;

wherein the number of clock cycles that elapse between the first clock cycle and the later clock cycle is dependent on the specified timing easing value; and wherein the payload data is not buffered by the timing easing circuitry and the payload path is configured to provide a multi-cycle path for transfer of the payload data from the initiator circuitry to the recipient circuitry between the first clock cycle and the later clock cycle.

2. A data processing apparatus as claimed in claim 1, wherein the transfer control information comprises a first signal issued by the initiator circuitry and a second signal issued by the recipient circuitry, the first and second signals being employed to implement a handshake protocol controlling timing of receipt of the payload data by the recipient circuitry, and at least the first signal being temporarily buffered by the timing easing circuitry.

3. A data processing apparatus as claimed in claim 2, wherein the first signal is a valid signal which when asserted identifies that the payload data is valid and the second signal is a ready signal which when asserted identifies that the recipient circuitry is available to receive the payload data, the timing easing circuitry being configured to be responsive to the valid signal being asserted to temporarily buffer the valid signal.

4. A data processing apparatus as claimed in claim 3, wherein the timing easing circuitry is configured while the valid signal is temporarily buffered to selectively modify the ready signal to prevent the ready signal if asserted from being forwarded to the initiator circuitry.

5. A data processing apparatus as claimed in claim 3, wherein the timing easing circuitry is further configured to temporarily buffer the ready signal.

6. A data processing apparatus as claimed in claim 5, wherein the ready signal is a sticky ready signal such that once the ready signal has been asserted, the ready signal cannot be de-asserted by the recipient circuitry until the asserted valid signal is received by the recipient circuitry, and the timing easing circuitry is configured to temporarily buffer the ready signal without increasing latency added to the transfer by the timing easing circuitry.

7. A data processing apparatus as claimed in claim 3, wherein the valid signal is a sticky valid signal such that once the valid signal has been asserted, the valid signal cannot be de-asserted by the initiator circuitry until the asserted ready signal is received by the initiator circuitry.

8. A data processing apparatus comprising:

initiator circuitry for initiating a transfer of payload data in a first clock cycle;

recipient circuitry for receiving the payload data the subject of the transfer in a later clock cycle;

a communication channel over which the payload data is passed from the initiator circuitry to the recipient circuitry, the communication channel further passing transfer control information associated with the transfer between the initiator circuitry and the recipient circuitry, timing of receipt of the payload data by the recipient circuitry being controlled by the transfer control information; and timing easing circuitry located within the communication channel for temporarily buffering at least the transfer control information generated by the initiator circuitry before outputting that transfer control information to the recipient circuitry, the timing easing circuitry being responsive to a specified timing easing value to determine a time for which that transfer control information is temporarily buffered before being output to the recipient circuitry;

wherein the number of clock cycles that elapse between the first clock cycle and the later clock cycle is dependent on the specified timing easing value; and wherein the timing easing circuitry comprises:

counter circuitry which is responsive to each iteration of the clock cycle following receipt by the timing easing circuitry of the transfer control information to modify a count value, the count value being initialised to an initial value, and the transfer control information being output when the count value reaches a predetermined value which is dependent on said specified timing easing value.

9. A data processing apparatus as claimed in claim 8, wherein the initial value of the count value is zero, and the count value is incremented on each iteration of the clock cycle, the timing easing circuitry further comprising:

comparator circuitry for comparing the count value with the specified timing easing value and for outputting the transfer control information that has been temporarily buffered once the count value reaches said predetermined value, said predetermined value being derived from the specified timing easing value.

10. A data processing apparatus as claimed in claim 8, wherein the counter circuitry is re-initialised when the transfer is received by the recipient circuitry.

11. A data processing apparatus as claimed in claim 8, wherein the transfer control information that is temporarily buffered is a single bit value, the counter circuitry is responsive to the transfer control information being set to a first value to begin modifying the count value, and the counter circuitry is responsive to the count value reaching the predetermined value to output the transfer control information set to said first value, thereby causing the transfer control information to be temporarily buffered.

12. A data processing apparatus as claimed in claim 1, wherein the specified timing easing value is fixed.

13. A data processing apparatus as claimed in claim 1, wherein the specified timing easing value is programmable.

14. A data processing apparatus as claimed in claim 8, wherein the specified timing easing value is fixed to specify one clock cycle and the counter circuitry comprises a register for storing the count value, the count value being initialised to zero, and being changed to a logic 1 value following the elapse of one clock cycle to thereby cause the transfer control information to be output, whereby two clock cycles are provided for the payload data to be passed over the communication channel from the initiator circuitry to the recipient circuitry.

15. A data processing apparatus comprising:

initiator circuitry configured to initiate a transfer of payload data in a first clock cycle;

recipient circuitry configured to receive the payload data the subject of the transfer in a later clock cycle;

a communication channel configured to pass the payload data from the initiator circuitry to the recipient circuitry, the communication channel further configured to pass transfer control information associated with the transfer between the initiator circuitry and the recipient circuitry, timing of receipt of the payload data by the recipient circuitry being controlled by the transfer control information; and timing easing circuitry located within the communication channel configured to temporarily buffer at least the transfer control information generated by the initiator circuitry before outputting that transfer control information to the recipient circuitry, the timing easing circuitry being configured to be responsive to a specified timing easing value to determine a time for which that transfer control information is temporarily buffered before being output to the recipient circuitry;

wherein the number of clock cycles that elapse between the first clock cycle and the later clock cycle is dependent on the specified timing easing value;

the data processing apparatus further comprising error determination circuitry configured to detect a mis-sampling of the signal by the recipient circuitry and generate an error signal upon such detection, the specified timing easing value being chosen in dependence on said error signal.

16. A method of controlling a transfer of payload data over a communication channel between initiator circuitry and recipient circuitry via a payload path, the communication channel further passing transfer control information associated with the transfer between the initiator circuitry and the recipient circuitry via a transfer control information path, timing of receipt of the payload data by the recipient circuitry being controlled by the transfer control information, the method comprising the steps of:

at the initiator circuitry, initiating the transfer of payload data in a first clock cycle;

at the recipient circuitry, receiving the payload data the subject of the transfer in a later clock cycle;

temporarily buffering, within timing easing circuitry located within the transfer control information path of the communication channel, at least the transfer control information generated by the initiator circuitry before outputting that transfer control information to the recipient circuitry; and controlling output of the transfer control information from the timing easing circuitry having regard to a specified timing easing value identifying a time for which that transfer control information is temporarily buffered;

whereby the number of clock cycles that elapse between the first clock cycle and the later clock cycle is dependent on the specified timing easing value; and the payload data not being buffered by the timing easing circuitry and the payload path providing a multi-cycle path for transfer of the payload data from the initiator circuitry to the recipient circuitry between the first clock cycle and the later clock cycle.

* * * * *